United States Patent
Cina et al.

(10) Patent No.: US 9,034,452 B2
(45) Date of Patent: May 19, 2015

(54) MOLD-IN TOUCH FASTENING PRODUCT

(71) Applicant: Velcro Industries B.V., Willemstad, Curacao (NL)

(72) Inventors: Michael Cina, Toronto (CA); Paul Joseph Voigt, Waterdown (CA); Man Wai Chan, Yuen Long (HK)

(73) Assignee: Velcro Industries B.V., Willemstadt (CW)

( * ) Notice: Subject to any disclaimer, the term of this patent is extended or adjusted under 35 U.S.C. 154(b) by 239 days.

(21) Appl. No.: 13/712,047

(22) Filed: Dec. 12, 2012

(65) Prior Publication Data
US 2013/0149490 A1   Jun. 13, 2013

Related U.S. Application Data

(60) Provisional application No. 61/570,035, filed on Dec. 13, 2011.

(51) Int. Cl.
*A44B 18/00* (2006.01)
*B32B 3/30* (2006.01)
*B32B 3/26* (2006.01)

(52) U.S. Cl.
CPC . *B32B 3/30* (2013.01); *B32B 3/266* (2013.01); *Y10T 428/24017* (2015.01); *A44B 18/00* (2013.01); *A44B 18/0049* (2013.01); *A44B 18/0065* (2013.01); *A44B 18/0076* (2013.01)

(58) Field of Classification Search
CPC ........... A44B 18/0076; B29C 44/1261; B60N 2/5833
USPC ..................................... 428/100, 119; 24/442
See application file for complete search history.

(56) References Cited

U.S. PATENT DOCUMENTS

| | | | |
|---|---|---|---|
| 4,842,916 A | 6/1989 | Ogawa et al. |
| 5,500,268 A | 3/1996 | Billarant |
| 5,688,576 A | 11/1997 | Ohno et al. |
| 6,463,635 B2 | 10/2002 | Murasaki |
| 6,656,563 B1 | 12/2003 | Leach et al. |
| 6,720,059 B2 | 4/2004 | Fujisawa et al. |
| 6,896,759 B2 | 5/2005 | Fujisawa et al. |
| 7,022,394 B2 | 4/2006 | Fujisawa et al. |
| 7,608,070 B2 | 10/2009 | Chen et al. |
| 2002/0164449 A1 | 11/2002 | Fujisawa et al. |
| 2002/0164451 A1 | 11/2002 | Fujisawa et al. |
| 2005/0160534 A1 | 7/2005 | Akeno et al. |
| 2007/0098953 A1 | 5/2007 | Stabelfeldt et al. |
| 2010/0181695 A1 | 7/2010 | Murasaki et al. |

FOREIGN PATENT DOCUMENTS

| | | |
|---|---|---|
| EP | 657118 A1 | 6/1995 |
| GB | 2468869 A | 9/2010 |

OTHER PUBLICATIONS

International Search Report and Written Opinion for PCT/IB2012/002941 mailed Jul. 8, 2013 (10 pp).

*Primary Examiner* — Alexander Thomas
(74) *Attorney, Agent, or Firm* — Fish & Richardson P.C.

(57) ABSTRACT

A male touch fastener strip includes an elongated base and a field of male fastener elements. The male touch fastener strip also includes longitudinal barrier walls rising from the broad face of the base on either side of the field of male fastener elements, and a pair of segmented walls. Each segmented wall and its nearest longitudinal barrier wall define therebetween a foam relief space. Each segmented wall defines a flow gap for allowing the foam material to enter the foam relief space.

14 Claims, 14 Drawing Sheets

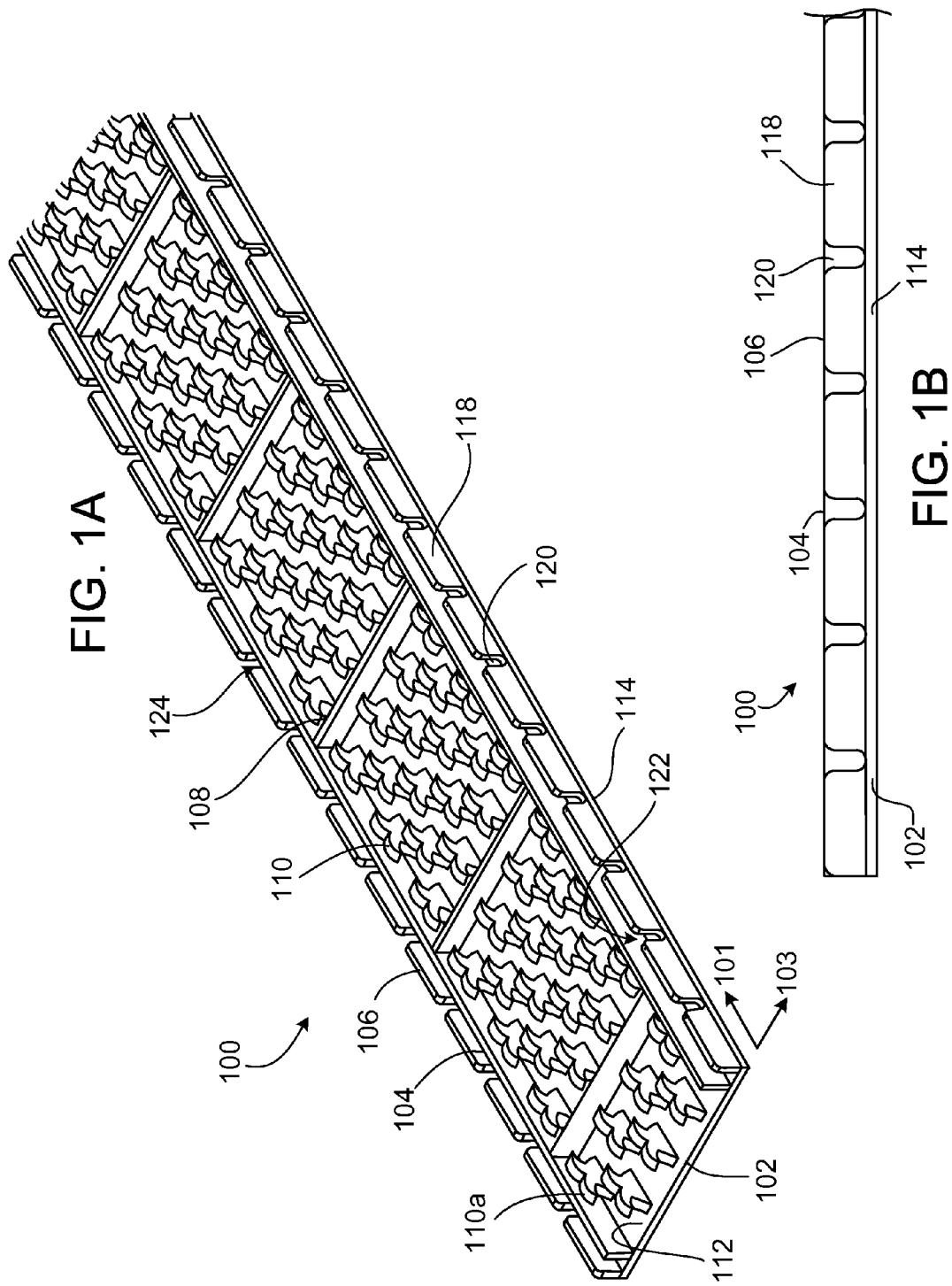

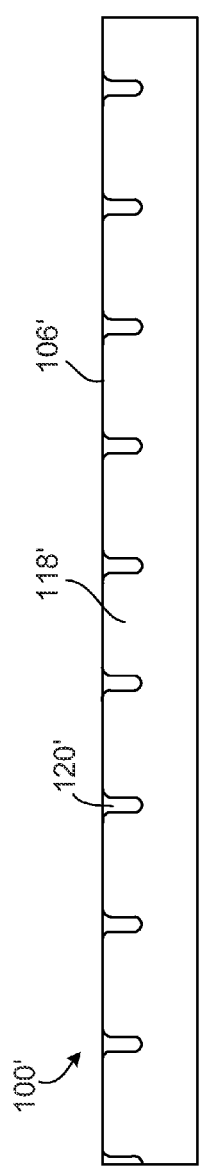
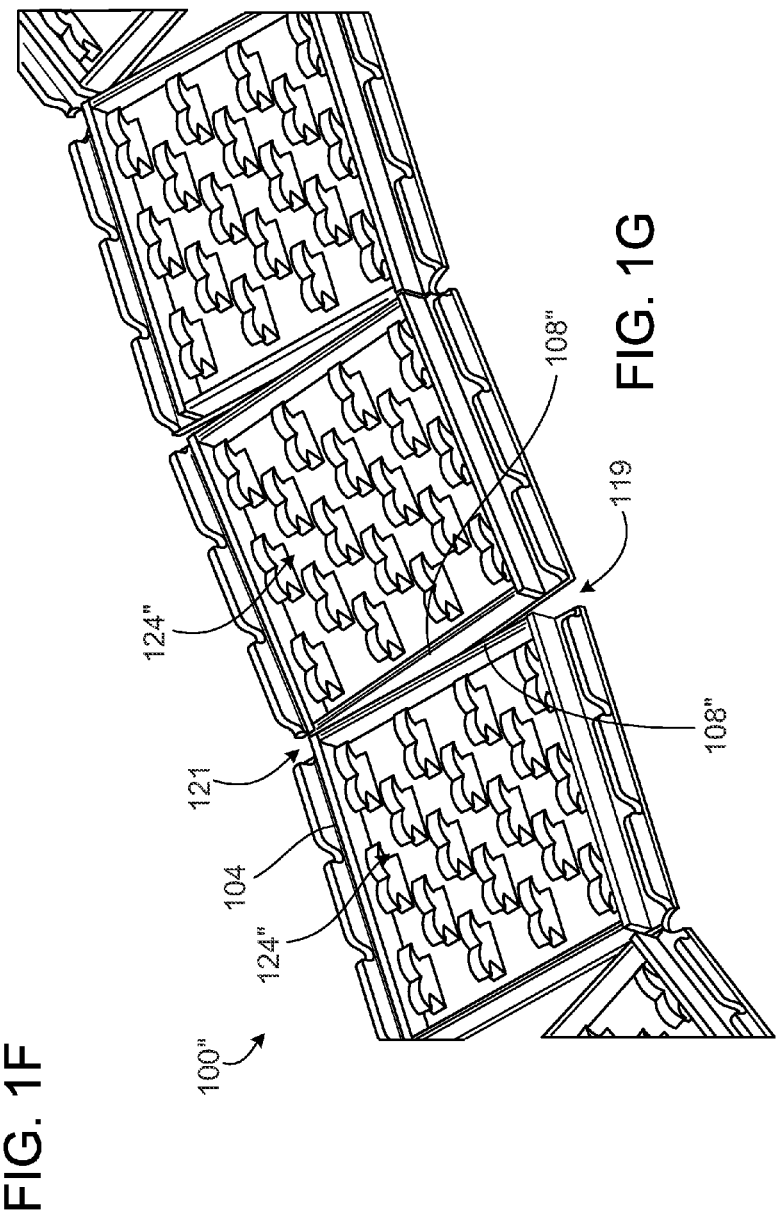

MOLD-IN TOUCH FASTENING PRODUCT

TECHNICAL FIELD

The present invention relates to touch fastening products, and more particularly to touch fastening products configured to be incorporated into molded articles.

BACKGROUND

Traditionally, hook-and-loop fasteners comprise two mating components that releasably engage with one another, thus allowing coupling and decoupling of the two surfaces or objects. The male fastener portion typically includes a substrate having fastener elements, such as hooks, extending from the substrate. Such fastener elements are referred to as "loop-engageable" in that they are configured to releasably engage with fibers of the mating component to form the hook-and loop-fastening.

Among other things, hook-and-loop fasteners are employed to attach upholstery to car seat cushions. Car seat cushions are typically made of a foam material. To attach the upholstery to the foam, one fastener product is incorporated at a surface of the foam car seat and the mating component is incorporated into the upholstery, or is provided by the upholstery itself. The male fastener elements releasably engage with the mating component to couple the upholstery to the foam car seat.

To incorporate a male fastener product into a foam cushion, the fastener product may be positioned within a cushion mold, such that as foam fills the mold to form the cushion, the foam adheres to the fastener product. Flooding of the fastener elements by the foam during forming of the cushion is generally seen as inhibiting the usefulness of the fastener elements, and so several improvements have been made to attempt to avoid such foam intrusion.

Further advances in the design of fastener products are sought, for this and for other applications.

SUMMARY

One aspect of the invention features a male touch fastener strip including an elongated base having a thickness and defining a longitudinal direction and a lateral direction perpendicular to the longitudinal direction across the base between longitudinal edges of the base, and a field of male fastener elements each having a stem extending from a broad face of the base and a head at an upper end of the stem and overhanging the base for engaging fibers. The fastener element stems and broad face of the base together form a unitary mass of resin. The male touch fastener strip also includes longitudinal barrier walls rising from the broad face of the base on either side of the field of male fastener elements, and a pair of segmented walls rising from the broad face of the base, each segmented wall of the pair disposed laterally outboard of a respective nearest one of the longitudinal barrier walls and including a series of wall segments defining longitudinal gaps therebetween. Each segmented wall and its nearest longitudinal barrier wall define therebetween a foam relief space for receiving a foam material, each respective foam relief space having a volume per unit strip length. By "volume per unit strip length" we mean the product of the distance between facing surfaces of a respective segmented wall and its nearest barrier wall and the height of the barrier wall. Each segmented wall defines a flow gap for allowing the foam material to enter the foam relief space, each respective flow gap having an area per unit strip length. By "flow gap" we mean the total exposed area of all flow enabled openings through and around a segmented wall. The ratio of foam relief space volume per unit strip length and flow gap area per unit strip length is between about 0.02 and 0.80 inch.

The ratio of foam relief space volume per unit strip length and flow gap area per unit strip length is preferably between about 0.20 and 0.50 inch, more preferably between about 0.30 and 0.45 inch. In some cases, this ratio is about 0.40 inch.

In some embodiments, each respective foam relief space has a width along the lateral direction of the base, and the combined widths of the foam relief spaces is between 10 and 35 percent of a width of the elongated base.

In some examples, the barrier walls each have a height at least as great as that of the male fastener elements.

In some implementations, the series of wall segments of each of the segmented walls extends from the broad face of the base to a height not greater than that of the nearest longitudinal barrier wall. In some applications, the height of the series of wall segments of each of the segmented walls is at least 0.004 inch less than the height of the nearest longitudinal barrier wall. In some implementations, the wall segments of each of the segmented walls extend from the broad face of the base to a height not greater than that of the male fastener elements.

In some cases, the elongated base includes a magnetically attractable material. In some examples, the male touch fastener strip further includes a lateral barrier wall spanning a length in the lateral direction of the base defined by facing surfaces of the longitudinal barrier walls. In some implementations, the lateral barrier wall extends from the broad face of the base to a height not greater than that of either of the longitudinal barrier walls. Some examples of the male touch fastener strip feature a plurality of lateral barrier walls, each spanning a length in the lateral direction defined by facing surfaces of the longitudinal barrier walls. In some applications, the lateral barrier walls and the longitudinal barrier walls form fastening cells that circumscribe one or more of the male fastener elements. In some applications, the lateral barrier walls are spaced apart from one another by between 0.3 and 0.5 inch in the longitudinal direction. In some examples, the fastener strip further includes a series of slits formed between adjacent lateral barrier walls, with each slit extending inward in the lateral direction from one longitudinal edge of the base towards an opposing longitudinal edge. In some cases, each slit is paired with a notch formed at the opposing longitudinal edge of the base. In some applications, a first slit is oriented from a first longitudinal edge of the base, and a second slit is oriented from a second longitudinal edge of the base, with the first longitudinal edge opposing the first longitudinal edge.

In some implementations, the male touch fastener strip further includes a respective plurality of foam disruptors extending from the broad face of the base within each of the foam relief spaces. In some cases, the foam disrupters in each respective foam relief space are spaced apart from one another in the longitudinal direction. The foam disrupters may include a plurality of spikes, for example, configured to disturb the structure of the foam material. In some applications, the foam disrupters include a plurality of stems or prongs configured to disturb the formation of the controlled amount of foam material. In some implementations, the foam disrupters have a height of about 0.01 inch. In some other examples, the foam disrupters have a height between about 1 and 100 nanometers.

Some examples feature foam disrupters extending from facing surfaces of a respective segmented wall and its nearest longitudinal barrier wall.

In some examples, the flow gap area per unit strip is between about 8 and 50 percent of an effective area of the segmented wall.

In some cases, the male touch fastener strip further includes a respective hinge incorporated into the broad face of the base and extending longitudinally within each of the foam relief spaces. In some implementations, the hinges are in the form of continuous indentations integrally molded with the broad face of the base. In some examples, each of the hinges includes a series of perforations through the base.

In some cases, the longitudinal gaps have a maximum width of at least about 0.02 inch along the longitudinal direction of the base.

Some examples of the fastener strip have a chain of fastening segments, each segment including respective longitudinal portions of the base, the field of male fastener elements, the longitudinal barrier walls and the segmented walls. Each segment is connected to at least one adjacent segment of the chain by a flexible neck of less width than the segment. In some cases, each of the longitudinal portions of the base includes a magnetically attractable material. In some implementations, each of the fastening segments includes a pair of lateral barrier walls spanning a length in the lateral direction defined by facing surfaces of the longitudinal barrier walls, and wherein the lateral barrier walls and the longitudinal barrier walls of each fastening segment form a fastening cell that circumscribes one or more of the male fastener elements. In some embodiments, each fastening segment includes at least one male fastener that is outside of the fastening cell. In some examples, the male touch fastener strip further includes a plurality of foam disruptors extending from the broad face of the base within each of the foam relief spaces, each of the fastening segments carrying at least one of the foam disrupters. In some examples, the male touch fastener strip further includes a respective hinge incorporated into the broad face of the base and extending longitudinally within each of the foam relief spaces, the portion of the base of each of the fastening segments including a portion of each hinge.

Another aspect of the invention features a male touch fastener strip with an elongated base having a thickness and defining a longitudinal direction and a lateral direction perpendicular to the longitudinal direction across the base between longitudinal edges of the base, and a field of male fastener elements each having a stem extending from a broad face of the base and a head at an upper end of the stem and overhanging the base for engaging fibers. The fastener element stems and broad face of the base together form a unitary mass of resin. The male touch fastener strip also includes longitudinal barrier walls rising from the broad face of the base on either side of the field of male fastener elements, and a pair of segmented walls rising from the broad face of the base, each segmented wall of the pair disposed laterally outboard of a respective nearest one of the longitudinal barrier walls along a respective longitudinal base edge and including a series of wall segments defining longitudinal gaps therebetween. The male touch fastener strip also includes a series of discrete foam disruptors disposed in a space between one of the segmented walls and its respective longitudinal barrier wall, the foam disrupters each forming a barb spaced from the segmented walls and longitudinal barrier walls and arranged to disrupt formation of bubbles of foam within the space.

Yet another aspect of the invention features a male touch fastener strip with an elongated base having a thickness and defining a longitudinal direction and a lateral direction perpendicular to the longitudinal direction across the base between longitudinal edges of the base, and a field of male fastener elements each having a stem extending from a broad face of the base and a head at an upper end of the stem and overhanging the base for engaging fibers. The fastener element stems and broad face of the base together forming a unitary mass of resin. The male touch fastener strip also includes longitudinal barrier walls rising from the broad face of the base on either side of the field of male fastener elements, and a pair of segmented walls rising from the broad face of the base, each segmented wall of the pair disposed laterally outboard of a respective nearest one of the longitudinal barrier walls along a respective longitudinal base edge and including a series of wall segments defining longitudinal gaps therebetween. The broad face of the base is structured to define hinges between the segmented walls and their respective longitudinal barrier walls, the hinges including discrete flex points of the base, each dividing the base between a central base section and a respective edge section, and in which the base is substantially more flexible than in its base section and edge sections.

Yet another aspect of the invention features a male touch fastener strip with an elongated base having a thickness and defining a longitudinal direction and a lateral direction perpendicular to the longitudinal direction across the base between longitudinal edges of the base, and a field of male fastener elements each having a stem extending from a broad face of the base and a head at an upper end of the stem and overhanging the base for engaging fibers. The fastener element stems and broad face of the base together form a unitary mass of resin. The male touch fastener strip also includes: two longitudinal barrier walls rising from the broad face of the base, each longitudinal barrier wall disposed on a respective side of the field of male fastener elements; a plurality of pairs of lateral barrier walls extending across the field between facing surfaces of the longitudinal barrier walls, the pairs of lateral barrier walls separating the field of male fastener elements into discrete field portions; and a series of slits through the elongated base, each slit disposed between the barrier walls of each pair and extending from one longitudinal edge of the base across more than half a width of the base, such that planar flexure of the base at each one of the slits opens an angle between one of the pairs of lateral barrier walls.

In some examples, each slit is paired with a notch formed at the opposing longitudinal edge of the base. In some applications, longitudinally adjacent slits extend from different longitudinal edges of the base. In some cases, each slit extends across one of the longitudinal barrier walls and terminates between the barrier walls. In some implementations, each lateral barrier wall spans an entire width of the strip between the longitudinal barrier walls Yet another aspect of the invention features a male touch fastener strip with an elongated base having a thickness and defining a longitudinal direction and a lateral direction perpendicular to the longitudinal direction across the base between longitudinal edges of the base, and a field of male fastener elements each having a stem extending from a broad face of the base and a head at an upper end of the stem and overhanging the base for engaging fibers. The fastener element stems and broad face of the base together forming a unitary mass of resin. The base comprises a series of longitudinally spaced base segments, each segment carrying a respective portion of the field of male fastener elements, adjacent base segments connected by a respective hinge formed by a single interconnecting base portion disposed closer to one of the longitudinal edges of the base than to another of the longitudinal edges of the base.

In some examples, each respective hinge features: a slit through the base and extending from one of the longitudinal edges of the base, across more than half of a width of the base between the longitudinal edges to the interconnecting base portion, and a notch through the base, the notch longitudinally aligned with the slit and disposed at an opposite longitudinal edge of the strip.

In some applications, with the strip arranged in a longitudinally straight condition, the slit is closed and the notch is open.

Many of the features of the examples described herein can help to promote secure attachment of the fastener strip within a foam body, such as a seat cushion. At least some of these features derive in part from the realization that a particularly controlled flow of foaming resin into the structure of the lateral edges of the fastening strip can be particularly advantageous in that regard, while leaving a sufficient proportion of the fastening elements exposed for engagement. The flow control achievable by the concepts described herein is even more important in fastener strips with relatively narrow fields of fastener elements, to achieve a secure attachment without overly reducing fastening properties.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A-1C are perspective, side, and top views of a first fastening product.

FIG. 1F is a side view of a first fastening product modified for ease of manufacturing.

FIG. 1G is a perspective view of a first fastening product modified to accommodate lateral bending.

Like reference symbols in the various drawings indicate like elements.

DETAILED DESCRIPTION

Figure 1C:
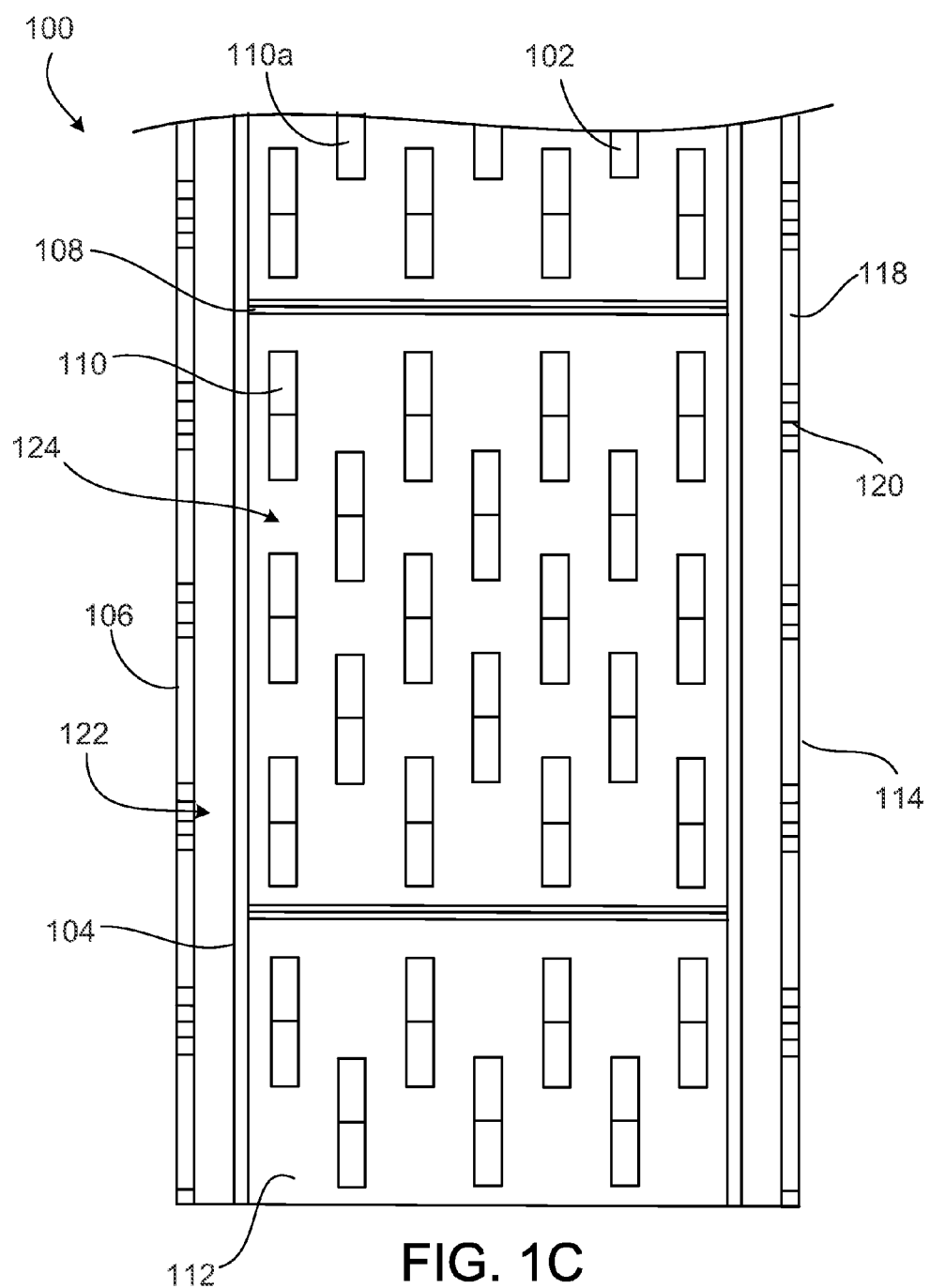

Referring to FIGS. 1A-1C, a fastening product 100 includes a substrate 102, barrier walls 104, segmented walls 106, lateral walls 108, and fastener elements 110. Substrate 102 defines a longitudinal (i.e., lengthwise) direction 101, and a lateral (i.e., widthwise) direction 103 that is perpendicular to the longitudinal direction. The substrate is a flexible, elongated base sheet of molded resin. Barrier walls 104 are continuous and extend integrally from an upper surface 112 of the substrate 102. In this example, the fastener product includes a pair of barrier walls spanning the length of the substrate in the longitudinal direction. Each of barrier walls 104 are positioned inboard of a respective longitudinal edge 114 of substrate 102.

When fastening product 100 is held against a flat surface, such as a surface of a mold pedestal (as discussed in detail below), barrier walls 104 contact the mold pedestal surface to inhibit (if not prevent) flowing resin from contacting fastening elements 110. Accordingly, in this example, the height of barrier walls 104 is at least as great as that of fastener elements 110. In some implementations, however, barrier walls 104 can be slightly shorter than fastener elements 110 (e.g., 0.004 inch or less in height). In these implementations, the barrier walls may not contact the mold pedestal surface. In some examples, a gap exists between the barrier walls and the flat surface of the pedestal that is small enough to inhibit or prevent foam intrusion. In some examples, the fastener elements are configured to bend or compress when held by force against the mold pedestal, to bring the barrier walls in contact with the flat surface of the pedestal.

Each of segmented walls 106 are disposed outboard of a respective barrier wall 104 (in lateral direction 103). In this example, segmented walls 106 are positioned along respective longitudinal edges 114 of substrate 102. Other appropriate configurations, however, can also be implemented. For example, segmented walls 106 can be positioned substantially inboard of longitudinal edges 114, leaving hangover extensions of the substrate outboard of the segmented walls. In this example, segmented walls 106 extend integrally from upper surface 112 and run parallel to barrier walls 104 down the length of substrate 102. As shown, each of segmented walls 106 includes a series of discrete wall segments 118. Wall segments 118 are spaced apart from one another to form longitudinal gaps 120 between adjacent segments. In some examples, the wall segments extend about 0.06 inch in the longitudinal direction of the base. Longitudinal gaps 120 can allow a flowable material (e.g., a liquefied or partially expanded foam) to pass through the segmented wall. In some examples, the longitudinal gaps have a maximum width along the longitudinal direction of the base that is at least about 0.02 inch. In a particular example, the longitudinal gaps have a width of about 0.11 inch.

Each of segmented walls 106 defines a respective flow gap. A flow gap can be described as the total exposed area of all flow enabled openings through and around the segmented wall. In this example, each of wall segments 118 has a height equaling that of barrier walls 104. Accordingly, the accumulation of longitudinal gaps 120 defines the flow gap of each segmented wall 106. In some implementations, however, the wall segments can be shorter than the barrier walls to augment the flow gap (as described in detail below). The dimensions of the flow gaps can be measured in terms of area per unit strip length of substrate 102. The dimensions of the flow gaps define the amount of foam that is allowed to pass through the segmented walls during the molding process of a foam article. In some examples, the flow gaps constitute between 8 percent and 50 percent of the effective area of the segmented walls.

Foam passing through segmented walls 106 enters foam relief spaces 122. The foam relief spaces are delimited by a respective segmented wall and its nearest barrier wall. The dimension of a foam relief space 122 can be measured in terms of its volume per unit strip length of substrate 102. The volume per unit strip length can be defined as a product of the distance between facing surfaces of a respective segmented wall and its nearest barrier wall and the height of the barrier wall.

In some cases, imperfections in a mold pedestal surface (e.g., scratches, dents, or uneven surfaces) can allow foam to flow past the barrier walls 104 and into contact with fastener elements 110. This can be inhibited (if not prevented), however, by permitting foam to enter and set-up in foam relief spaces 122. In some examples, the cured or solidified foam can form an integral seal with the mold tool surface, preventing flow past the barrier walls. Additionally, allowing the foam to set-up around wall segments 118 can increase the bond strength between fastening product 100 and a foam molded article (e.g., a seat cushion). For instance, the solidified foam around wall segments 118 can act as an anchor holding fastening product 100 to the seat cushion. In some examples, the fastener product is configured to achieve an appropriate ratio of foam relief space volume per unit strip length and flow gap area per unit strip length. This ratio will be referred to herein as the "foam relief ratio". In some examples, the flow gaps and foam relief space can be appropriately dimensioned to provide an appropriate foam relief ratio.

Providing a fastener product with an appropriate foam relief ratio allows the foam passing through the flow gaps of segmented walls 106 to expand and set-up around wall segments 118, without exerting excessive force on fastening product 100. For example, when the foam relief ratio is too large, a deficient amount of foam enters the foam relief space. As a result, the solidified foam may not provide a strong anchor to the foam molded article. Conversely, when the foam relief ratio is too small, an excessive amount of foam enters the foam relief space. When the excessive amount of foam expands, a force is exerted on the fastening product (e.g., against substrate 102 and barrier walls 104). In some cases, the force may be sufficient to urge the fastening product away from the mold pedestal surface, allowing foam to pass under the barrier walls. In some examples, an appropriate foam relief ratio is between about 0.02 and 0.80 inch. Foam relief ratios between about 0.20 and 0.50 inch or about 0.30 and 0.45 inch can also be implemented.

Fastener elements 110 are flexible and extend upward from upper surface 112 of substrate 102. The fastener elements are arranged in discrete fields or arrays separated by lateral walls 108. Each of fastener elements 110 has a head spaced above upper surface 112, and each head has two distal tips that extend in opposite directions to form loop overhangs (i.e., palm-tree type fastening elements). Thus, the fastener elements are configured to releasably engage fibers of a mating component (not shown) to form a hook-and-loop fastening. Other appropriate types of fastening elements can also be used. For example, J-hook and/or mushroom-type fastening elements can be implemented.

In this example, lateral walls 108 laterally traverse an inner area between facing surfaces of respective barrier walls 104 to isolate arrays of fastener elements 110. In some implementations, however, the lateral walls extend beyond the barrier walls, traversing the inner area between facing surfaces of the outer segmented walls. Lateral walls 108, in conjunction with barrier walls 104 demarcate individual fastening cells 124. The fastener cells are effectively sealed against ingress of foam, when the fastening product is held against a flat surface of a mold pedestal. As shown, the lateral walls are disposed at predetermined intervals down the length of the substrate. In this manner, lateral walls 108 allow fastener product 100 to be manufactured in continuous spools that can be severed to form various lengths of fastening strips. In some examples, the inner surfaces of the lateral walls are spaced apart from one another by between about 0.3 and 0.5 inch. In some examples, a continuous spool of the fastener product can be severed so as to leave a number of fastening elements 110a exposed to foam (as shown in FIG. 1A). The exposed fastening elements can act as anchor points to the molded foam article. Further, as with barrier walls 104 and segmented walls 106, lateral walls 108 can extend integrally from upper surface 112. The height of lateral walls 108 can be equal to that of barrier walls 104.

In a particular example, each of barrier walls 104, segmented walls 106, and lateral walls 108 extend from upper surface 112 of substrate 102 to a height of 0.051 inch. Barrier walls 104 and segmented walls 106 are provided having a thickness of 0.012 inch. In a particular example, the distance between facing surfaces of barrier walls 104 is 0.364 inch, and the distance between lateral walls 108 is 0.450 inch. Accordingly, the area of fastening cells 124 is about 0.164 $inch^2$. Such fastening cells can, for example, accommodate an array of 18 fastener elements. In a particular example, wall segments 118 have a length of about 0.124 inch and are spaced apart by about 0.029 inch to form longitudinal gaps 120. In a particular example, the width of foam relief spaces 122 (i.e., the distance between facing surfaces of a segmented wall and its nearest barrier wall) is 0.030 inch. Accordingly, the foam relief ratio is about 0.16 inch. In some examples, the combined width of the foam relief spaces can be between about 10 percent and 35 percent of the total width of the substrate.

Figure 1D:
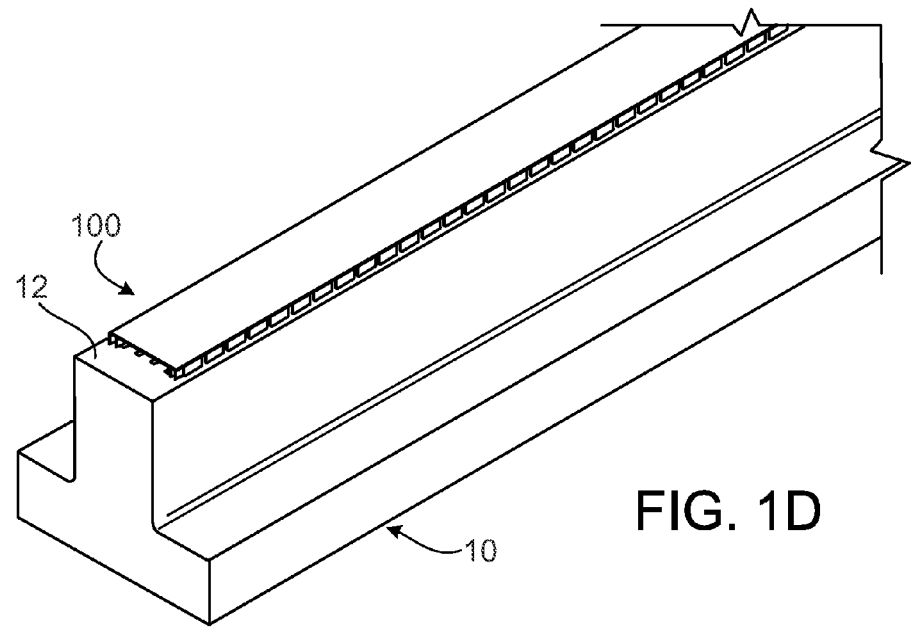
FIGS. 1D and 1E are perspective and side views of the fastening product of FIG. 1, held against the surface of a mold pedestal.
Figure 1E:
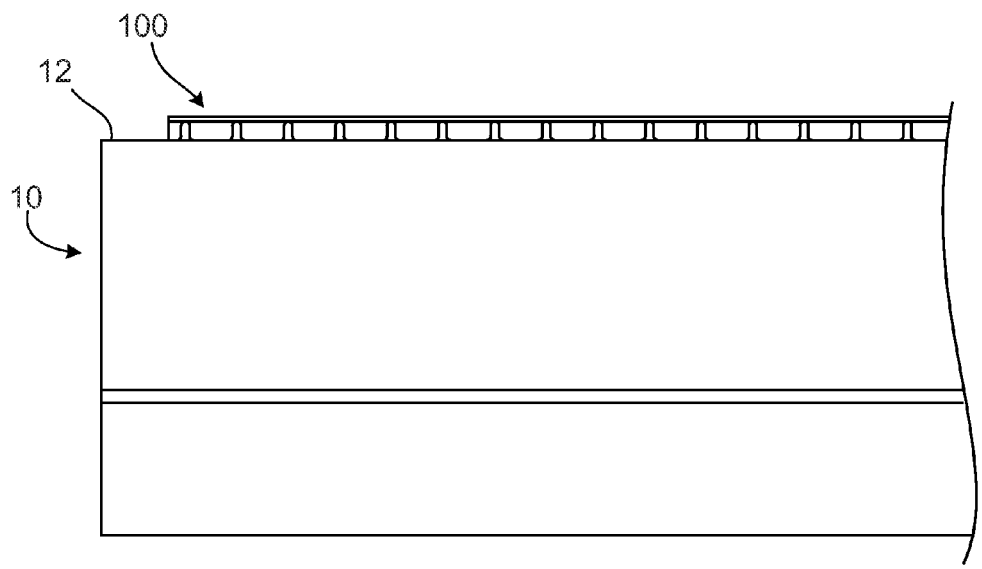

Turning to FIGS. 1D and 1E, fastener product 100 can be held against a mold pedestal 10. For example, one or more elements of fastener product 100 can be formed as a contiguous mass of magnetically attractable resin, such that the fastening product is attracted by a magnet to hold it against a flat mold pedestal surface 12. When fastener product 100 is held against mold pedestal 10, its barrier walls and lateral walls contact mold pedestal surface 12 such that flow of foam passed the barrier walls and into contact with the fastener elements is inhibited (if not prevented). As discussed above, longitudinal gaps between neighboring outer wall segments of the fastener product provide a flow gap allowing foam to enter appropriately dimensioned foam relief spaces.

FIG. 1F shows a modified fastener product 100', where the longitudinal gaps 120' between the wall segments 118' extend partway down the segmented wall 106' (as opposed to entirely down the segmented wall as shown in FIGS. 1A and 1B). This modified fastener product can be easier to manufacture while still providing a sufficient flow gap. In this example, the fastener product was designed such that the flow gaps constitute about 8.4 percent of the effective area of the segmented walls. In addition, the foam relief ratio is about 0.40.

FIG. 1G shows yet another modified fastener product 100" designed to provide lateral flexibility. Fastener product 100" features a series of slits 119 formed between adjacent lateral walls 108" of each fastening cell 124". Slits 119 extend inward from one longitudinal edge of the base towards the opposing edge. In this example, slits 119 pass entirely through the barrier wall 104 near the opposing longitudinal edge of the base such that each fastening cell 124" is separated from any adjacent cell. As shown, each of slits 119 is paired with a small notch 121 at the opposing longitudinal edge. In this particular example, the notches are formed as a semicircular indentation formed in the base material. However, it is appreciated the notches might also have other designs without departing from the scope of this disclosure. Together, notch 121 and slit 119 form a hinge point in the base material to accommodate lateral bending. The slit and notch pairs can be oriented on either longitudinal edge of the fastener product. In some examples, the series of slit and notch pairs are formed in a specific pattern (e.g., X number of pairs that allow bending from the left followed by X number of pairs that allow bending from the right. and so on). In some examples, all of the slit and notch pairs are oriented on the same longitudinal edge. Of course, the fastener product can be customized in this regard based on the desired application.

Figure 1H:
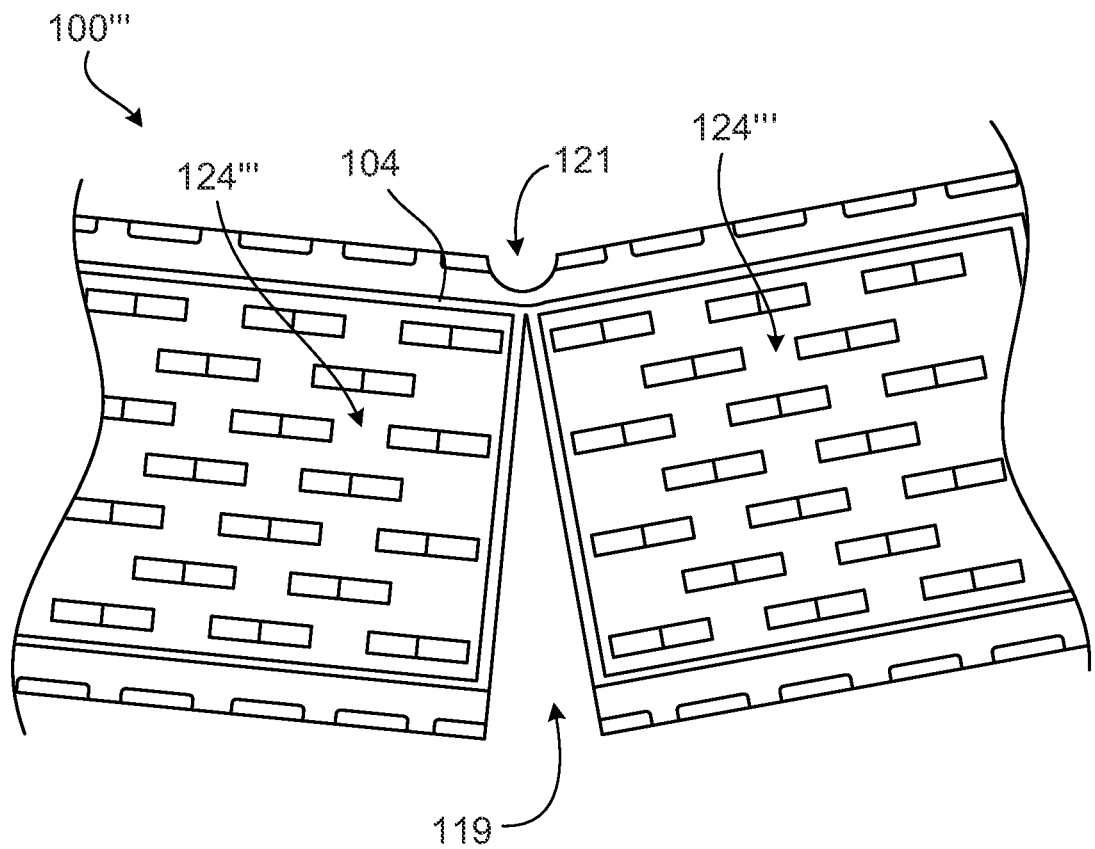
FIG. 1H is a top view of a first fastening product modified to accommodate lateral bending about a relatively strong hinge point.

FIG. 1H shows still another modified fastener product 100''' designed to provide lateral flexibility. Fastener product 100''' is similar to the previous example. However, in this case, slits 119 terminate at the barrier wall 104 near the opposing longitudinal edge of the base. Thus, in this example, adjacent fastening cells 124''' remain connected to one another by the barrier wall 104. This design can provide a stronger hinge point, including both the base material and that of the walls rising upward from the broad surface of the base.

Figure 2A:
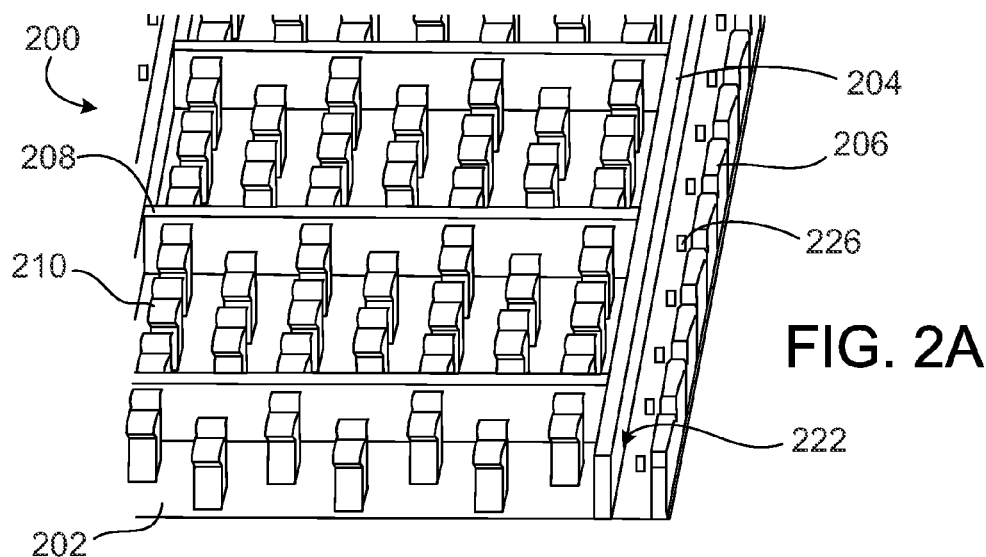
FIGS. 2A-2C are perspective, side, and enlarged views of a second fastening product.
Figure 2B:
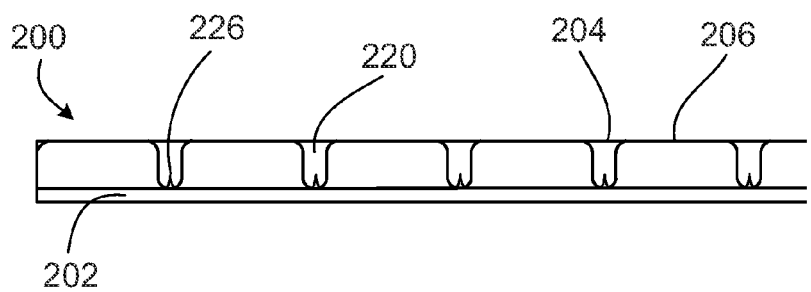
Figure 2C:
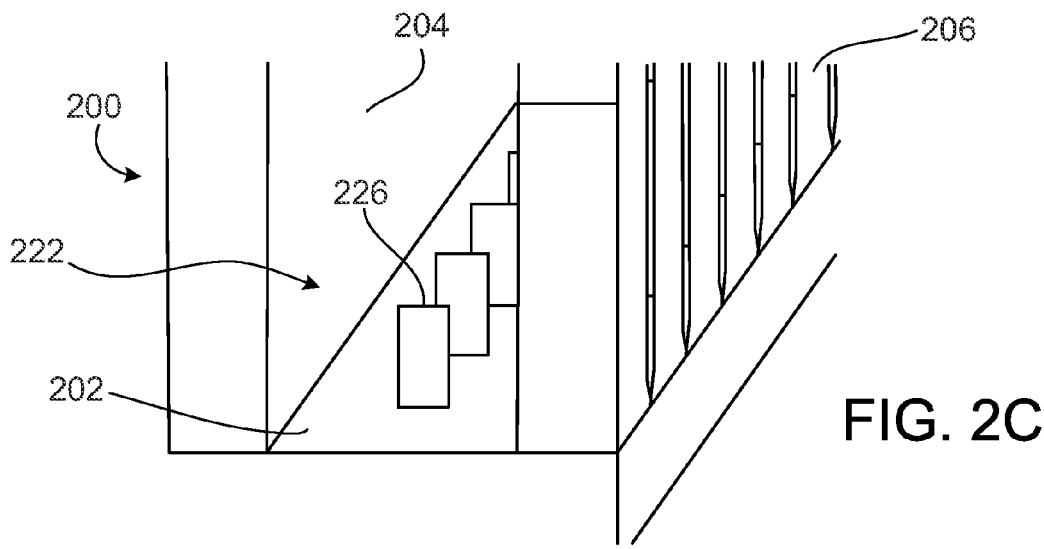

Referring to FIGS. 2A-2C, another example fastener product 200 includes foam disrupters 226. Fastener product 200 is similar in its configuration to fastener product 100. For example, fastener product 200 includes a substrate 202, barrier walls 204, segmented walls 206, lateral walls 208, and fastener elements 210. Foam disrupters 226 are located within foam relief spaces 222. In this example, the foam disrupters 226 extend from the upper surface of substrate 202. In some other examples, however, foam disrupters can additionally, or alternatively, extend from facing surfaces of a segmented wall and/or its nearest longitudinal wall.

As shown, foam disrupters 226 are arranged in a straight-line longitudinal sequence, such that each of the foam disrupters is spaced apart from any neighboring foam disrupters by a constant interval. Further, in this example, foam disrupters 226 are aligned with each of longitudinal gaps 220. As such, the foam disrupters can contact incoming foam before the foam sets-up (e.g., while the foam is still at least partially liquefied) and cannot be effectively disrupted. Other configurations of the foam disrupters can also be used, however. For example, additional foam disrupters that are not aligned with the longitudinal gaps can be provided. Further, in some implementations, the density of foam disrupters per unit strip length of the substrate varies. For instance, a first length of the substrate can be provided with more or less foam disrupters than a second length. In this example, the foam disrupters are provided in the form of small molded spikes or barbs having the shape of a triangular prism. However, other types of foam disrupters can also be used (e.g., upstanding stems or prongs). The height of the foam disrupters is at most equal to that of the fastening elements.

Foam disrupters 226 are configured to disturb the structure of foam entering the foam relief spaces. For example, the foam disrupters can collapse the foam by breaking foam bubbles. Collapsing foam entering foam relief spaces 222 increases the foam's density. As a result, the strength the foam is increased while its expansion ratio is decreased. Accordingly, providing an appropriate configuration of foam disrupters 226 allows the foam passing through the flow gaps of segmented walls 206 to expand and set-up in foam relief spaces 222, without exerting excessive force on fastening product 200. As noted above, in some cases, expansion of the foam can exert sufficient force to urge the fastening product away from the flat surface of a mold pedestal surface, allowing foam to enter into the interior of the fastening cells. Foam disrupters 226 can also serve as additional anchor points holding the fastener product to a molded article when the foam cures or sets up in the foam relief spaces.

In a particular example, each of the foam disrupters extends from the upper surface of the substrate to a height of 0.012 inch, and widthwise (i.e., in the lateral direction of the substrate) to 0.006 inch. The foam disrupters are disposed within the foam relief spaces at a constant longitudinal distance interval of about 0.154 inch.

Other implementations of the foam disrupters can also be used. For example, the foam disrupters can be provided in the form of a surface roughness (e.g., foam disrupters with a height between about 1 and 100 nanometers) applied to one or more of the walls delimiting the foam relief spaces. In some examples, the foam disrupters are placed at random within the foam relief spaces, such that no discernable pattern or sequence is achieved. In some examples, the foam disrupters can have various appropriate sizes and shapes.

Figure 3A:
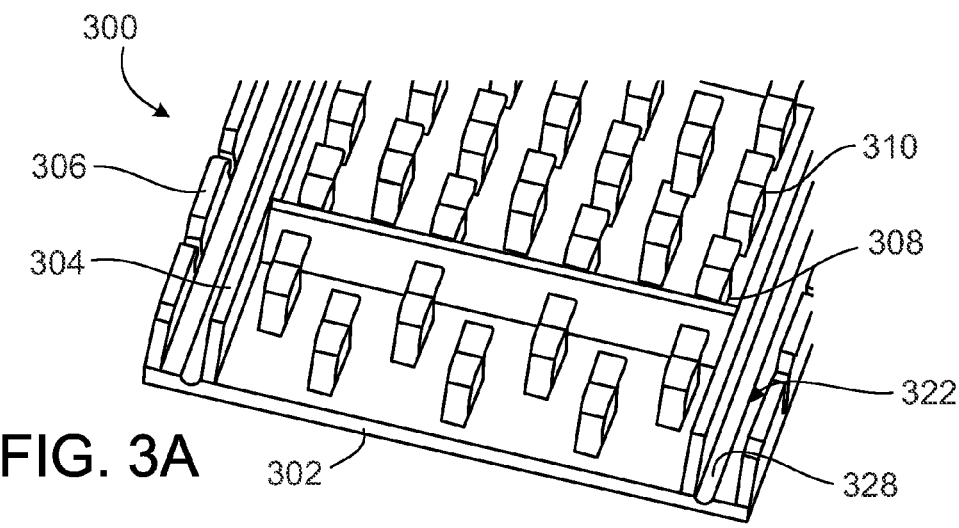
FIGS. 3A-3C are perspective, front, and enlarged views of a third fastening product.
Figure 3B:
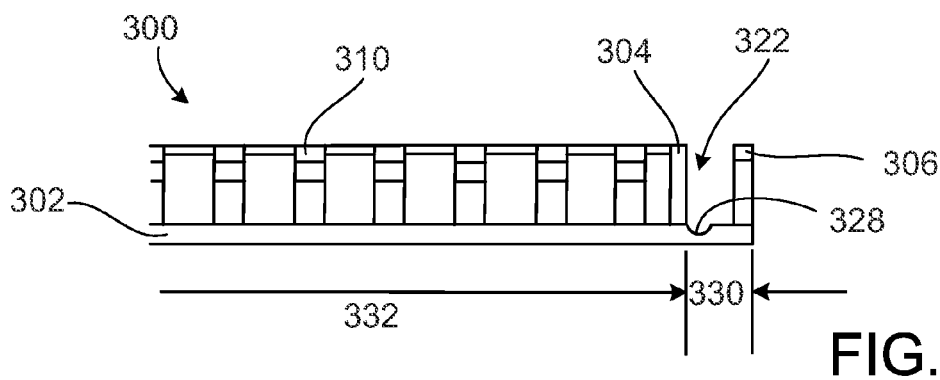
Figure 3C:
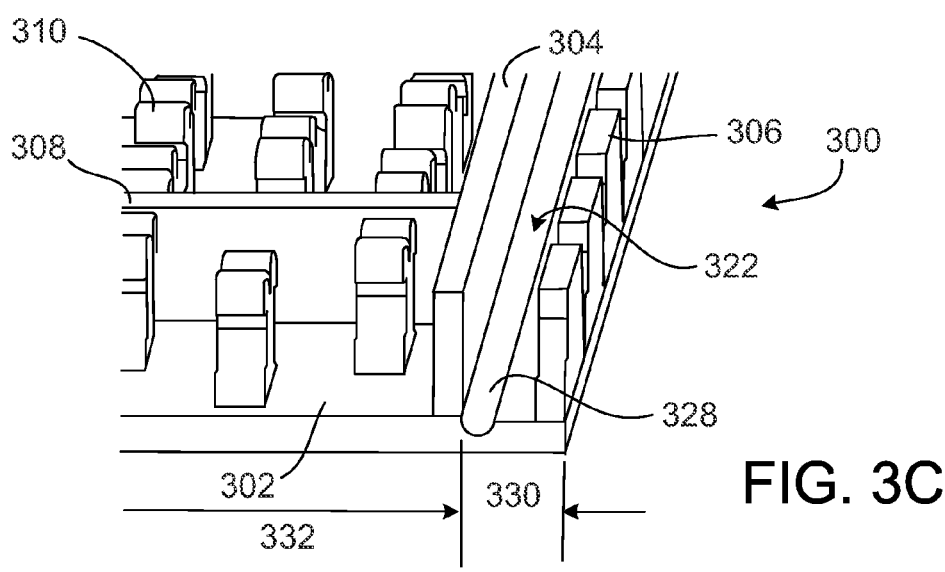

Referring to FIGS. 3A-3C, another example fastener product 300 includes hinges 328. Fastener product 300 is similar in its configuration to fastener product 100. For example, fastener product 300 includes a substrate 302, barrier walls 304, segmented walls 306, lateral walls 308, and fastener elements 310. Hinges 328 are incorporated into the upper surface of substrate 302 within foam relief spaces 322. In this example, hinges 328 are provided in the form of continuous indentations integrally molded with the substrate 302 and positioned just outboard of barrier walls 304. In some examples, the hinges are at most about 0.008 inch deep. Other implementations of the hinges can also be used (e.g., perforations or folds in the substrate).

Hinges 328 can allow outer portions 330 (e.g., the portions of the fastener product outboard of the hinges) of the fastener product to flex relative to an inner portion 332. The degree of flexure is determined based on the material properties of the base substrate and the dimensions of the hinges. In a particular example, the hinges are 0.013 inch wide, and about 0.0065 inch deep. Allowing the outer edge portions to flex relative to the inner portion of the fastener can reduce stress near the longitudinal edges of the substrate. These stresses can result from various operations in forming the molded foam article. For example, in molding the article, stress is imparted on the fastening product near its longitudinal edges when foam expands in the foam relief spaces. High stress also occurs during other common processes such as de-molding and roller crushing. When the fastener product is secured to the molded product, the hinges allow the outer portions to move with the cured foam. As a result, crack formation and propagation near the longitudinal edges is inhibited.

As shown, hinges 328 extend longitudinally along the length of the substrate, substantially parallel to the barrier walls and segmented walls of the fastening product. However, in some examples, the fastening product can include lateral hinges that traverse the width of the fastener product. The lateral hinges can be incorporated into the backside surface of the substrate 302, and disposed at predetermined intervals down the substrate's length. Incorporating lateral hinges into the fastening product can increase flexibility in the longitudinal direction, such that the fastening product is more suited for winding about a take-up roll and forming a continuous spool.

Figure 4A:
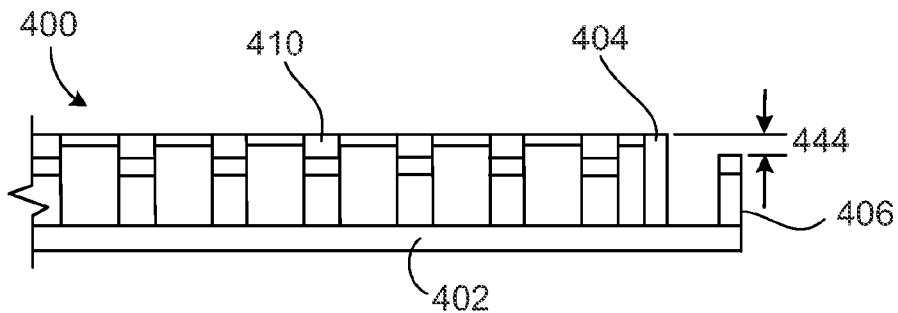
FIGS. 4A-4C are front, side, and enlarged views of a fourth fastening product.
Figure 4B:
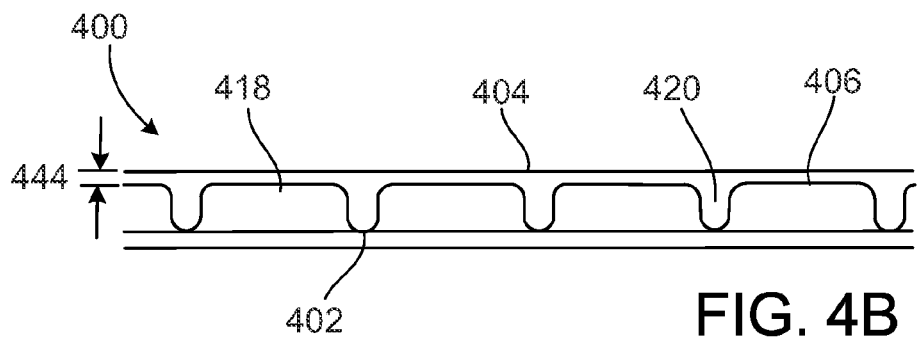
Figure 4C:
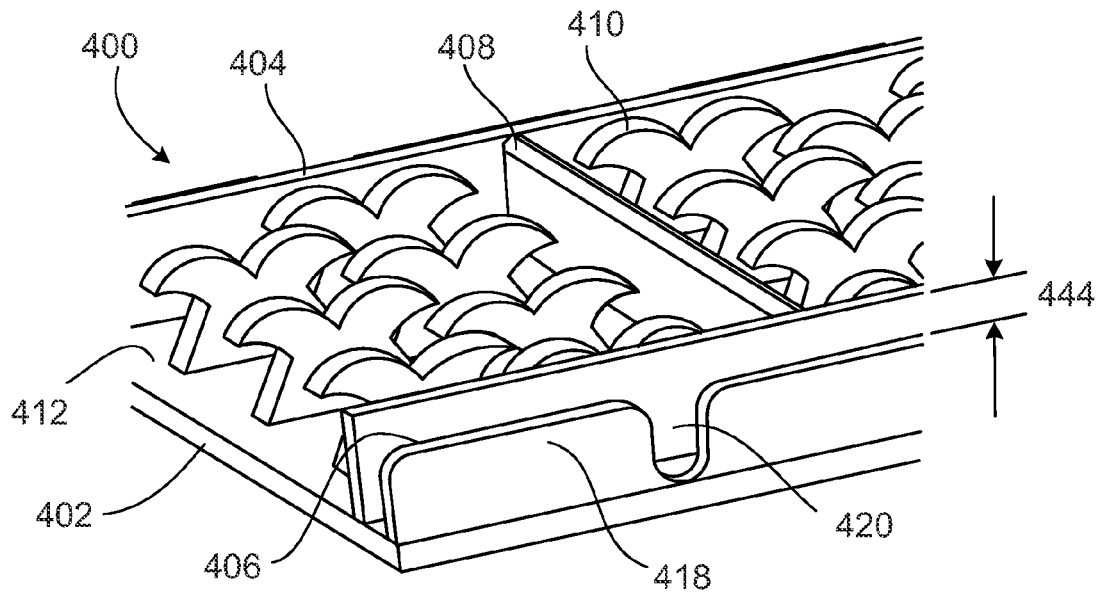

Referring to FIGS. 4A-4C, another example fastener product 400 has an augmented flow gap. Fastener product 400 is similar in its configuration to fastener product 100. For example, fastener product 400 includes a substrate 402, barrier walls 404, segmented walls 406, lateral walls 408, and fastener elements 410. In this example, wall segments 418 extend from the upper surface of substrate 402 to a height that is significantly lesser than that of barrier walls 404. For example, the height of the wall segments is substantially less than the height of the barrier walls (e.g., at least 0.004 inch shorter). In a particular example, the difference in height between the wall segments and the barrier walls is about 0.011 inch. As shown, the height difference provides additional flow openings 444 for foam to enter the foam relief spaces. Accordingly, the flow gap of each segmented wall 406 includes the open area provided by both flow openings 444 and longitudinal gaps 420. Although, in the illustrated examples, each of the wall segments are the same height, other implementations exist where each of the wall segments has a respective height (for example, some wall segments will be taller or shorter than other wall segments).

Figure 5A:
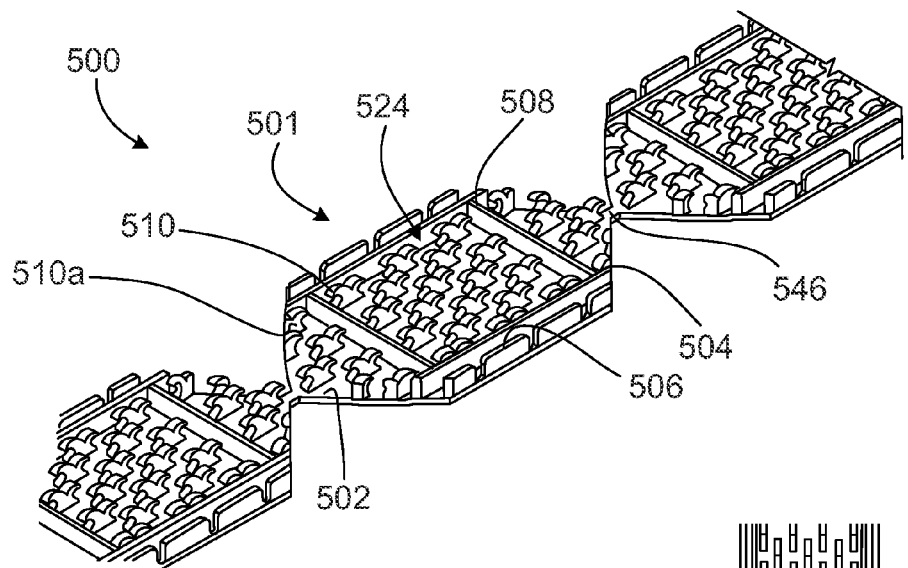
FIGS. 5A and 5B are perspective and top views of a fifth fastening product.
Figure 5B:
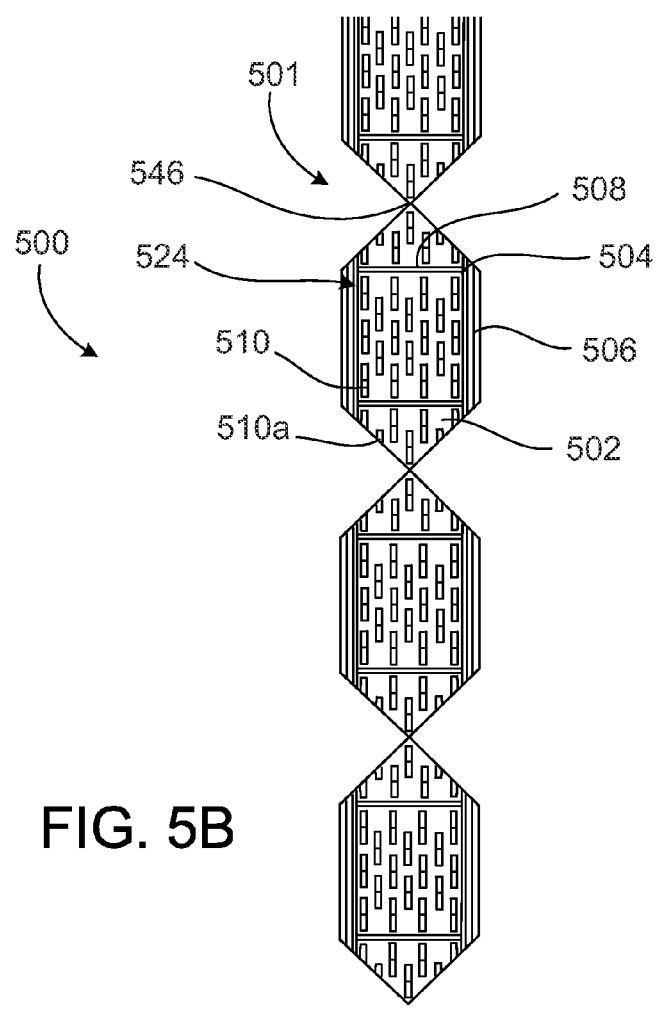

Referring to FIGS. 5A-5C, another example fastener product 500 includes a chain of multiple fastening segments 501. Each of the fastening segments includes a substrate 502, barrier walls 504, segmented walls 506, lateral walls 508, and fastener elements 510 and 510a. Fastener segments 501 are connected to one another by a flexible neck 546. More particularly, in this example, the flexible neck connects the base substrates of neighboring fastener segments to one another. As shown, the width of the flexible neck is less than the width of each segment. In some examples, the flexible neck can be flexible around three orthogonal axes. Accordingly, the flexible neck 546 can allow connected fastening units to move relative to one another.

As shown, the barrier walls 504 and lateral walls 508 of each segment 501 define a fastener cell 524 which seals fastener elements 510 from contact with foam material during a molding process. Fastener elements 510a, which are disposed outside of fastener cells 524, remain exposed during the molding process. As such, when fastener product 500 is held against a mold pedestal, flowing foam is allowed to contact and surround fastener elements 510a, but not fastener members 510. Therefore, fastener elements 510a can act as anchor points for securing fastener product 500 to a molded foam article, while fastener elements 510 remain available for engagement to a mating fastening component.

In some examples, the barrier walls and segmented walls of each fastening segment provide foam relief spaces that are appropriately dimensioned based on a foam relief ratio (as described above). In some examples, each of the fastening segments includes multiple foam disrupters positioned within the foam relief spaces (as described above). The foam disrupters can be configured to disturb the structure of foam entering the foam relief spaces. In some examples, each of the fastening segments includes hinges positioned in the foam relief spaces (as described above) that allow outer portions of the fastener product to flex relative to an inner portion.

The fastening products described above may be used in a variety of fastening applications. For example, in addition to conventional foam molding applications, the arrangements of the fastening elements and walls can also be employed on a rigid fastening surface, such as injection molded fastening products. The following description provides details of an example application of a fastening product having the types of configurations discussed above.

Figure 6A:
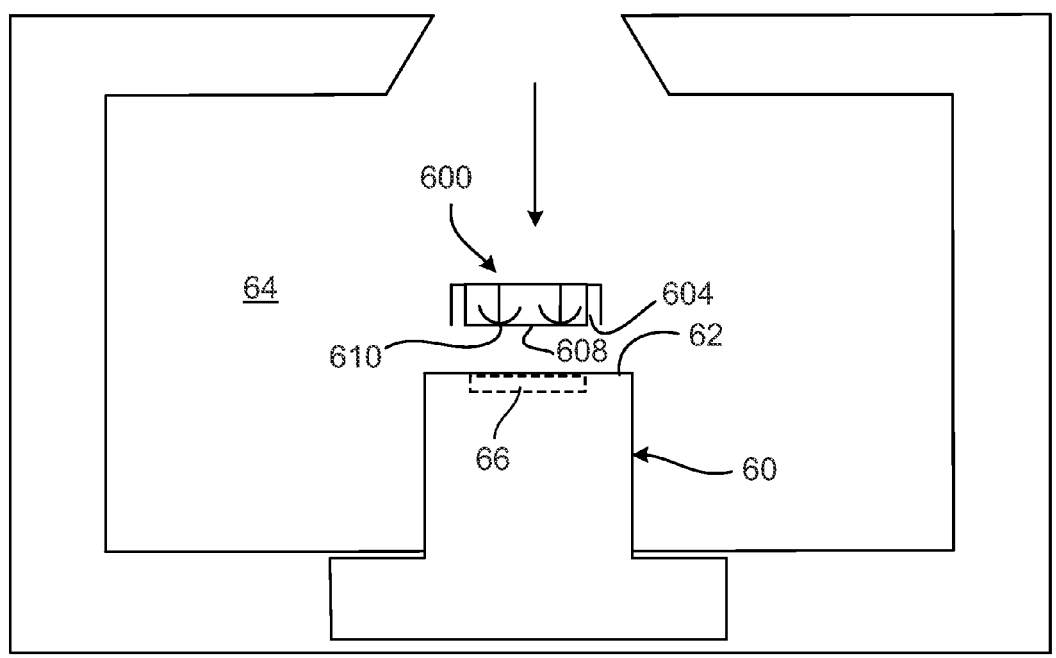
FIGS. 6A-6D schematically and sequentially illustrate a process for forming a molded foam article with a fastening product embedded in one surface of the article.
Figure 6B:
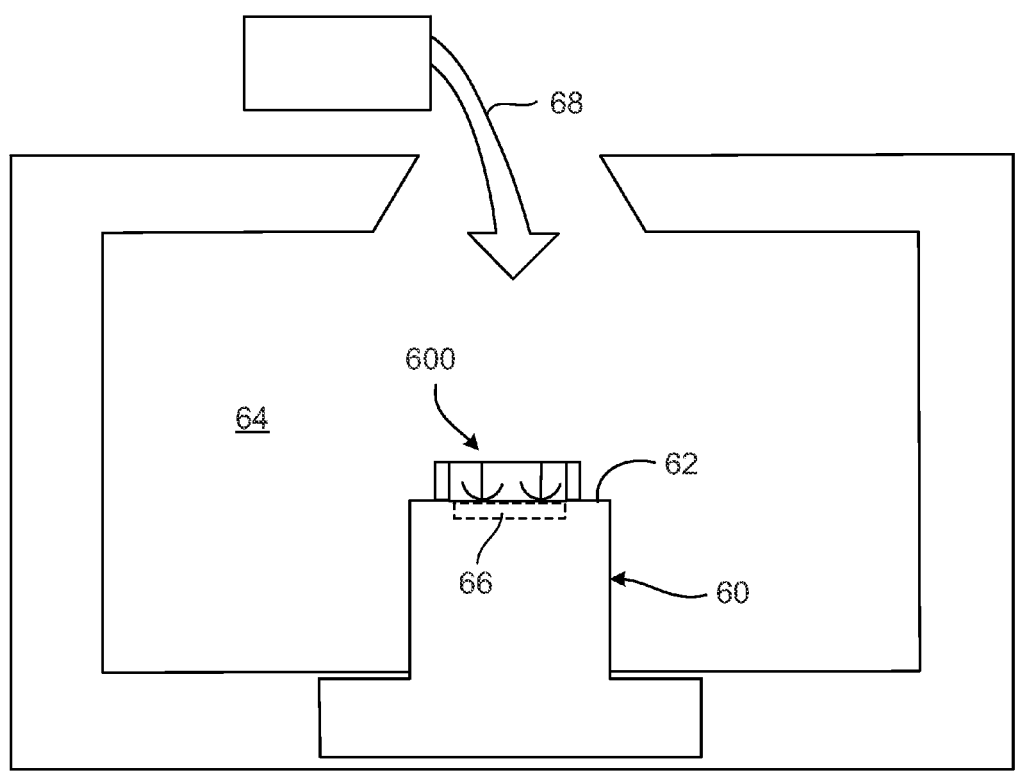

As shown in FIG. 6A, fastener product 600 is placed on a flat surface 62 of a mold pedestal 60. Mold pedestal 60 is disposed in the interior space of a mold cavity 64. Fastener elements 610 of the product face the mold pedestal surface. As described above, the fastener elements are arranged on the surface of the supporting substrate in arrays bounded by the walls of neighboring fastener cells (i.e., the barrier walls 604 and lateral walls 608). As shown in FIG. 6B, fastener product 600 is held against flat surface 62 by an embedded magnet 66 that attracts the fastener product. Magnetic attraction may be due to magnetically attractable resin forming all or part of the fastener product, or may be due to some other magnetically attractable material (e.g., a metal shim or mesh that is secured to or embedded in the substrate of the product).

Figure 6C:
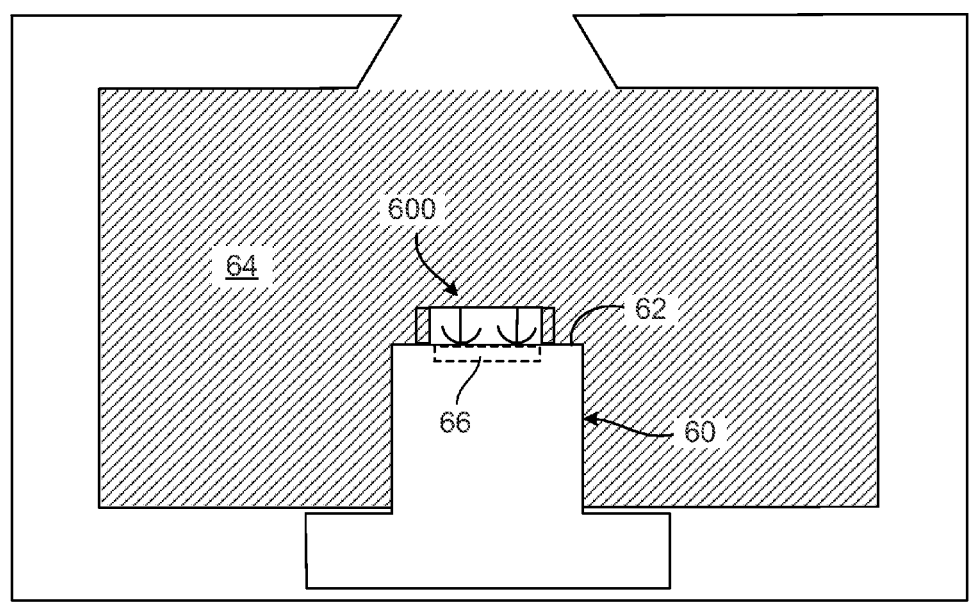

Referring to FIG. 6B, liquid foam resin 68 is introduced into the mold cavity 64. Liquid foam 68 may constitute a single component, or there may be multiple components that are mixed as they are introduced into the mold cavity, or before. In some implementations, polymeric foams (e.g., polyurethane foam, latex foam, and the like) are used. As shown in FIG. 6C, the liquid foam expands to fill the mold cavity. In some examples, the mold cavity can include a number of vents (now shown) to allow gas displaced by the expanding foam to exit the mold cavity. Suitable venting arrangements for the mold cavity are disclosed in U.S. Pat. Nos. 5,587,183 and 7,878,785, the entire contents of which are hereby incorporated by reference.

As the liquid foam fills the mold cavity, the foam is allowed to pass through segmented walls in the fastening product and enter appropriately dimensioned foam relief spaces. The foam relief spaces allow the foam to expand without forcing the fastener product away from the mold pedestal surface. The walls of the fastening cells effectively seal the interior space housing the fastening elements against the flat pedestal surface. Accordingly, the flowing foam is inhibited from contacting the fastener elements.

Figure 6D:
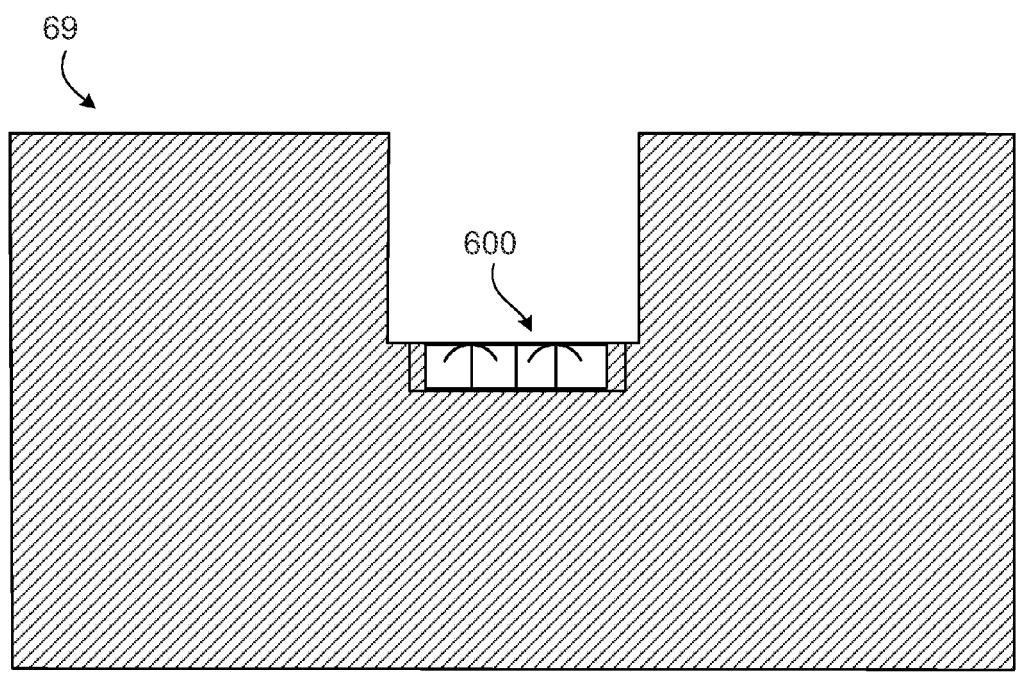

Referring to FIG. 6D, a molded foam article 69, as removed from the mold cavity, has fastening product 600 embedded in a trench defined by the mold pedestal. The perimeter of the fastener product is surrounded by foam. Foam also occupies the foam relief spaces, anchoring fastening product 600 to the foam article 69. The barrier walls and lateral walls of the fastening product form flow barriers to inhibit, if not prevent, foam from contacting the interior fastening elements. As a result, the fastener elements remain exposed and functional to releasably engage with fibers of a mating component (not shown) to form a hook-and-loop fastening.

Other appropriate molding techniques and apparatus can be used to form a molded article with an incorporated fastener product. For instance, in some examples, the fastening product can be placed directly on a surface of the mold (e.g., in a trench of the mold), as opposed to the mold pedestal surface shown and described herein.

Figure 7:
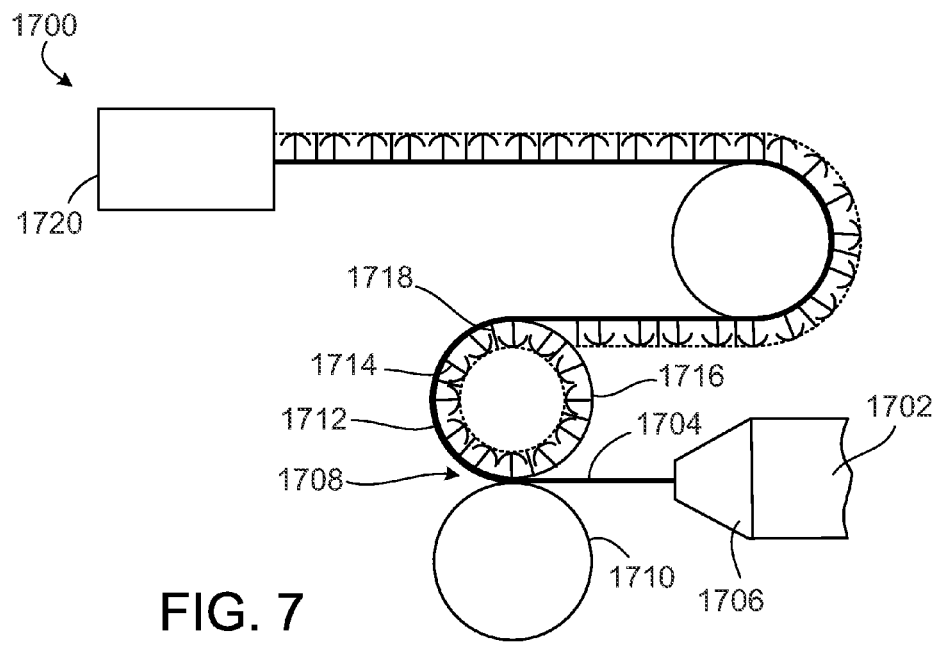
FIG. 7 is a side view of an apparatus for forming a fastening product.

The fastener products disclosed herein can be formed as flexible, continuous strips or sheets of material in a continuous roll molding process. Referring to FIG. 7, manufacturing apparatus 1700 has an extruder barrel 1702 that melts and forces a molten resin 1704 through a die 1706 and into a nip 1708 between a pressure roller 1710 and a cavity roller 1712. Cavity roller 1712 has cavities 1714 defined about its perimeter 1716 that are shaped to form the fastener elements of the product, and other cavities 1718 that are configured to form the walls of the product, as the base substrate is formed on the outer surface of the cavity roller. Pressure in the nip forces the molten resin into the various cavities, leaving some resin remaining on the cavity roller surface. The resin travels around the cavity roller, which is chilled to promote resin solidification, and the solidified product is then stripped from the cavity roller by pulling the solidified fastener elements and walls from their respective cavities. The fastener elements, walls and their respective cavities are illustrated schematically and are not to scale. In many cases the cavity roller will be of a diameter of between 30 and 50 centimeters, and the fastener elements and walls will be less than 1.5 millimeter in height (as described above), to give a sense of perspective.

After the continuous length of fastening material is formed, it moves through a die-cutting station 1720, where discrete fastener products are sequentially severed from the material. The remaining fastener material may be discarded or, in some cases, ground up and recycled to make further material.

Figure 8:
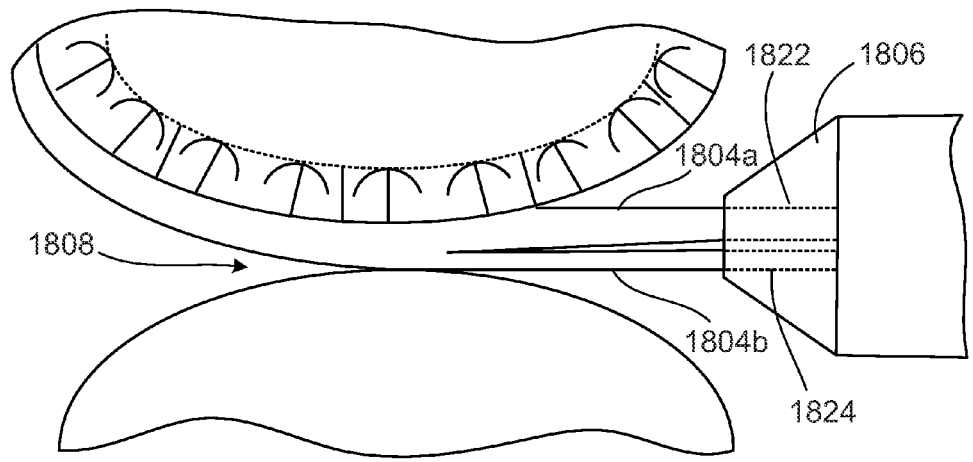
FIG. 8 is a side view of an apparatus for forming a fastening product as a coextrusion.

Referring to FIG. 8, the apparatus and process of FIG. 7 may be modified to mold the fastening product from multiple resins, by extruding two molten resins together into the nip. In this example, a sufficient amount of a molten resin 1804*a* is extruded into nip 1808 to form the walls and fastener elements of the fastener product, while another flow of molten resin 1804*b* is introduced to the nip to form the base substrate of the product. The two resins are forced through a cross-head die head 1806 with two different die orifices 1822 and 1824, to join in the nip. A respective pool of each of the resins forms just upstream of the nip. In the nip, resin 1804*a* is forced into the cavity roller to form the fastener elements and the walls, while resin 1804*b* is calendered to form the substrate. The pressure in the nip also permanently laminates resin 1804*a* with resin 1804*b* to form the finished fastener product. In one example, resin 1804*b* is a magnetically attractable resin, while resin 1804*a* is a resin selected for wall and/or fastener element performance. In another example, the amount of each resin flow is modified such that the amount of resin 1804*a* is sufficient only to fill the head portions of the fastener element cavities and the inner extents of the wall-forming cavities, and is selected to have a lower durometer to provide the finished product with a softer feel and to enhance sealing of the upper wall surfaces against a foaming mold surface. In another example, the amount of each resin flow is adjusted such that resin 1804*a* fills the cavities and forms the upper surface of the substrate, with resin 1804*b* forming only the back portion of the substrate.

It will be seen by those skilled in the art that many embodiments taking a variety of specific forms and reflecting changes, substitutions, and alternations can be made without departing from the spirit and scope of the invention. Therefore, the described embodiments illustrate but do not restrict the scope of the claims.

What is claimed is:
1. A male touch fastener strip comprising:
an elongated base having a thickness and defining a longitudinal direction and a lateral direction perpendicular to the longitudinal direction across the base between longitudinal edges of the base;
a field of male fastener elements each having a stem extending from a broad face of the base and a head at an upper end of the stem and overhanging the base for engaging fibers, the fastener element stems and broad face of the base together forming a unitary mass of resin;
longitudinal barrier walls rising from the broad face of the base on either side of the field of male fastener elements;
a pair of segmented walls rising from the broad face of the base, each segmented wall of the pair disposed laterally outboard of a respective nearest one of the longitudinal barrier walls, each segmented wall comprising a series of wall segments defining longitudinal gaps therebetween;
wherein each segmented wall and its nearest longitudinal barrier wall define therebetween a foam relief space for receiving a foam material, each respective foam relief space having a volume per unit strip length;
wherein each segmented wall defines a flow gap for allowing the foam material to enter the foam relief space, each respective flow gap having an area per unit strip length; and
wherein the ratio of foam relief space volume per unit strip length and flow gap area per unit strip length is between about 0.02 and 0.80 inch.

2. The male touch fastener strip of claim 1, wherein the ratio of foam relief space volume per unit strip length and flow gap area per unit strip length is between about 0.20 and 0.50 inch.

3. The male touch fastener strip of claim 1, wherein the ratio of foam relief space volume per unit strip length and flow gap area per unit strip length is between about 0.30 and 0.45 inch.

4. The male touch fastener strip of claim 1, wherein the ratio of foam relief space volume per unit strip length and flow gap area per unit strip length is about 0.40 inch.

5. The male touch fastener strip of claim 1, wherein each respective foam relief space has a width along the lateral direction of the base, and wherein the combined widths of the foam relief spaces is between 10 and 35 percent of a width of the elongated base.

6. The male touch fastener strip of claim 1, wherein the barrier walls each have a height at least as great as that of the male fastener elements, and the series of wall segments of each of the segmented walls extends from the broad face of the base to a height not greater than that of the male fastener elements.

7. The male touch fastener strip of claim 6, wherein the height of the series of wall segments of each of the segmented walls is at least 0.004 inch less than the height of the nearest longitudinal barrier wall.

8. The male touch fastener strip of claim 1, further comprising a plurality of lateral barrier walls, each of the lateral barrier walls spanning a length in the lateral direction defined by facing surfaces of the longitudinal barrier walls to form fastening cells that circumscribe one or more of the male fastener elements.

9. The male touch fastener strip of claim 8, wherein the lateral barrier walls are spaced apart from one another by between 0.3 and 0.5 inch in the longitudinal direction.

10. The male touch fastener strip of claim 1, further comprising a respective plurality of foam disruptors extending from the broad face of the base within each of the foam relief spaces, the foam disrupters configured to disturb the structure of the foam material.

11. The male touch fastener strip of claim 1, further comprising a plurality of a foam disrupters extending from facing surfaces of a respective segmented wall and its nearest longitudinal barrier wall.

12. The male touch fastener strip of claim 1, wherein the flow gap area per unit strip is between about 8 and 50 percent of an effective area of the segmented wall.

13. The male touch fastener strip of claim 1, wherein the longitudinal gaps have a maximum width along the longitudinal direction of the base, and wherein the maximum width of the longitudinal gaps is at least about 0.02 inch.

14. The male touch fastener strip of claim 1, wherein the fastener strip comprises a chain of fastening segments, each segment comprising respective longitudinal portions of the base, the field of male fastener elements, the longitudinal barrier walls and the segmented walls, and wherein each segment is connected to at least one adjacent segment of the chain by a flexible neck of less width than the segment.

* * * * *